(12) United States Patent
Oh et al.

(10) Patent No.: US 7,408,933 B2
(45) Date of Patent: Aug. 5, 2008

(54) DISTRIBUTED ROUTER WITH PING-PONG PREVENTING FUNCTION AND PING-PONG PREVENTING METHOD USING THE SAME

(75) Inventors: Jong-Sang Oh, Suwon-si (KR); Byung-Gu Choe, Seoul (KR); Yong-Seok Park, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 602 days.

(21) Appl. No.: 10/781,748

(22) Filed: Feb. 20, 2004

(65) Prior Publication Data

US 2004/0165604 A1    Aug. 26, 2004

(30) Foreign Application Priority Data

Feb. 20, 2003    (KR)    ............... 10-2003-0010827

(51) Int. Cl.
    H04L 12/56    (2006.01)
(52) U.S. Cl. ............... 370/392; 370/401; 370/412; 370/419
(58) Field of Classification Search ............... 370/401, 370/395, 351, 200, 389, 392, 412, 419
See application file for complete search history.

(56) References Cited

U.S. PATENT DOCUMENTS

| | | | | |
|---|---|---|---|---|
| 6,018,526 A | * | 1/2000 | Liu et al. | ............... 370/401 |
| 6,249,820 B1 | * | 6/2001 | Dobbins et al. | ............... 709/238 |
| 6,594,704 B1 | | 7/2003 | Birenback et al. | |
| 6,618,782 B1 | | 9/2003 | Gulick et al. | |
| 6,625,689 B2 | | 9/2003 | Narad et al. | |
| 6,631,136 B1 | * | 10/2003 | Chowdhury et al. | ... 370/395.31 |
| 6,651,122 B2 | | 11/2003 | Porterfield | |
| 6,674,756 B1 | | 1/2004 | Rao et al. | |
| 6,680,933 B1 | | 1/2004 | Cheesman et al. | |

(Continued)

OTHER PUBLICATIONS

*BGP Table Data of Active BGP Entries and BGP Reports, Report last updated at Tue, Nov. 25, 2003 4:1:12 UTC+1100*, http://bgp.potaroo.net/.

Primary Examiner—Seema S. Rao
Assistant Examiner—Sai Ming Chan
(74) Attorney, Agent, or Firm—Robert E. Bushnell, Esq.

(57) ABSTRACT

A distributed router able to reduce occurrence of ping-pong of data and information packets within the architecture of the distributed router constructed with a main processor, a plurality of line connection units and a switching unit, is disclosed. The main processor manages a routing table, updates the routing table, and broadcasts the changes in routing information that are received. The switching unit switches packets either to the main processor or to the respective line connection units. A plurality of forwarding tables are positioned in different corresponding ones of the plurality of line connection units, to copy, store and manage a part of the routing table. A plurality of forwarding processors are positioned in different corresponding ones of the plurality of line connection units, to transmit each packet to an output port, to determine whether the output port of a packet received from the switching unit is connected to either an external router or the switching unit, and to transmit each packet to the external router when the output port is connected to the external router, and discard any packet when the output port is connected to the switching unit.

10 Claims, 9 Drawing Sheets

U.S. PATENT DOCUMENTS

| | | |
|---|---|---|
| 6,680,952 B1 | 1/2004 | Berg et al. |
| 6,681,230 B1 | 1/2004 | Blott et al. |
| 6,683,874 B1 | 1/2004 | Nagami et al. |
| 7,031,320 B2 * | 4/2006 | Choe ..................... 370/395.31 |

* cited by examiner

DISTRIBUTED ROUTER WITH PING-PONG PREVENTING FUNCTION AND PING-PONG PREVENTING METHOD USING THE SAME

CLAIM OF PRIORITY

This application makes reference to, incorporates the same herein, and claims all benefits accruing under 35 U.S.C. §119 from an application for DISTRIBUTED ROUTER WITH PING-PONG PREVENTING FUNCTION AND PING-PONG PREVENTING METHOD USING THE SAME earlier filed in the Korean Intellectual Property Office on the 20 of Feb. 2003 and there duly assigned Serial No. 2003-10827.

BACKGROUND OF THE INVENTION

1. Field of the Invention

The present invention relates generally to distributed routers and processes and, more particularly, to distributed architecture routers and routing processes with a ping-pong preventing function that is capable of preventing the unnecessary repetition of transmission of a packet through an erroneous path between forwarding processors.

2. Description of the Related Art

In general, a router includes four components: an input port, an output port, switching fabric and a routing processor.

The input port is a point of contact with a physical link, and a pathway for receiving packets. The output port accumulates and schedules packets to transmit the packets to an output link. The switching fabric internally connects the input and output ports to each other. The routing processor executes a routing protocol, and creates a forwarding table that is used for packet forwarding.

When processing performance does not catch up with the input speed at which packets are being received by a router when a routing function is implemented by software that is executed in a processing environment, a bottleneck phenomenon occurs. Furthermore, when in the routing process, a packet forwarding operation adds a header to an input packet and then the input packet with the added header is again transmitted, the speed of traffic is adversely affected.

Currently, as the volume of Internet traffic increases exponentially, a distributed router constructed with a distributed architecture has been proposed in an effort to accommodate the increase in Internet traffic.

Additionally, in order to speed up a routing function, a high-speed forwarding engine technique is being developed in which the packet forwarding operation will be separately handled.

Accordingly, in terms of system architecture, there is a growing tendency to prefer a distributed architecture with forwarding engines that are positioned in respective line connection units of a server-type architecture in which a single forwarding engine is shared by a plurality of line connection units.

A distributed router serves to forward packets of information and data; in essence, a distributed router performs a routing function and a packet forwarding function in different line connection units. A main processor constructs and updates its own routing table, and transmits updated routing information to a forwarding engine through InterProcessor Communication (IPC) within a system. The forwarding engine constructs and updates its own forwarding table using the changed routing information received.

Generally, propagation delays occur during the interval between the updating of the routing table in the main processor and the updating of the forwarding table in the forwarding engine. Accordingly, user packets entering during the propagation delay are transmitted along an erroneous routing path, that is, an out-of-date path that has been provided for transmission of the packets on the basis of out-of-date routing information stored in a forwarding table.

When the updated routing information has not reached all of the line connection units prior to the initiation of transmission of a packet, one line connection unit will, in reliance upon out-of-date forwarding information stored in its forwarding table, invariably repeat the transmission and reception of the packet to and from another line connection unit. This phenomenon is referred to as "ping-pong". If "ping-pong" occurs in a distributed router, a loop is inevitably formed within the distributed router; this causes a considerable reduction in the bandwidth of an IPC.

SUMMARY OF THE INVENTION

Accordingly, the present invention has been made by keeping in mind the above problems occurring in prior art, and an object of the present invention is to provide a distributed router with a ping-pong prevention function and a method of using the distributed router, which eliminates the transmission of a packet that unnecessarily reduces the bandwidth of an IPC when processing a packet while updating a forwarding table in the distributed router, so that an updating time will be reduced when the forwarding table is updated, and the performance of the system will be thereby improved.

In order to accomplish these and other objects, embodiments of the principles of the present invention provide a distributed router with a function that prevents the occurrence of ping-pong, with a distributed router having a main processor, a plurality of line connection units and a switching unit. The main processor constructs and manages a routing table, receives changes in routing information from adjacent routers, updates the routing table, and broadcasts the changes in routing information received, through IPC paths. The switching unit switches the packets received from either the line connection units or main processor, to the main processor or to the respective line connection units to which these packets are transmitted. A plurality of forwarding tables are positioned in different corresponding ones of the plurality of line connection units, to copy, store and manage a part of the routing table.

A plurality of forwarding processors are positioned in different corresponding ones of the plurality of line connection units, to ascertain output direction of each packet received from an external router by looking up forwarding information stored in their corresponding forwarding tables, and then transmit each of those packets to the output direction ascertained from the forwarding table. The forwarding processors. determine whether an output direction of a packet input from the switching unit is toward the external router or switching unit by searching among the forwarding information stored in the forwarding table for the corresponding packet, transmit that packet to the external router whenever the output direction is toward the external router, and discard that packet whenever the output direction is toward the switching unit. The forwarding processors receive the up-dated changes in routing information broadcast by the main processor through the internal IPC paths of the distributed router, and then update their forwarding tables on the basis of those changes in the routing information.

Additionally, embodiments of the principles of the present invention provide a distributed router with a ping-pong prevention function. A distributed router may be constructed in accordance with those principles with a plurality of line connection units and a switching unit. A plurality of main processors may be positioned in different corresponding ones of the plurality of line connection units, to construct and manage a routing table, receive changes in routing information from adjacent routers, update the routing table, and broadcast the received changes in routing information through IPC paths of the distributed router. The switching unit switches packets received from the line connection units to the respective line connection units to which these packets are to be transmitted. A plurality of forwarding tables are located in the different corresponding ones of the plurality of line connection units, to copy, store and manage a part of the routing table.

A plurality of forwarding processors are located in different corresponding ones of the plurality of line connection units, looking-up forwarding information in the corresponding forwarding table in order to ascertain an output direction of a packet received from an external router, and transmit that packet toward the output direction ascertained. The forwarding processors determine whether an output direction of a packet input from the switching unit is toward the external router or switching unit by making a searching among the forwarding information stored in the forwarding table for the corresponding packet, transmit that packet to the external router whenever the output direction is toward the external router, and discard that packet whenever the output direction is toward the switching unit. The forwarding processors receive the changed routing information broadcast by the main processor through the internal IPC paths of the distributed router, and then update their associated forwarding table on the basis of the changes in routing information.

Further embodiments of the principles of the present invention provide ping-pong prevention using a distributed router. The distributed router may be implemented with a main process or, a plurality of line connection units and a switching unit. In a first step of the process, the main processor updates a routing table, and transmits the changes in the routing information to the respective line connection units through internal IPC paths of the distributed router whenever the main processor receives changed routing information from an adjacent router. In a second step, forwarding processors located in each of the line connection units receive the changes in routing information broadcasted from the main processor through the internal paths of the distributed router, and updates an associated forwarding table. In a third step, the forwarding processor receives a packet from either an external router or the switching unit, ascertains input and output directions of this packet, discharges that packet whenever both input and output are toward the switching unit, and transmits that packet whenever either or both of the input and output directions are not toward the switching unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3A is a block diagram schematic showing an exemplary configuration of a distributed router with a ping-pong prevention function in one embodiment of the present invention, while

DESCRIPTION OF THE PREFERRED EMBODIMENTS

Reference now should be made to the drawings, in which the same reference numerals are used throughout the different drawings to designate the same or similar components.

Figure 1:
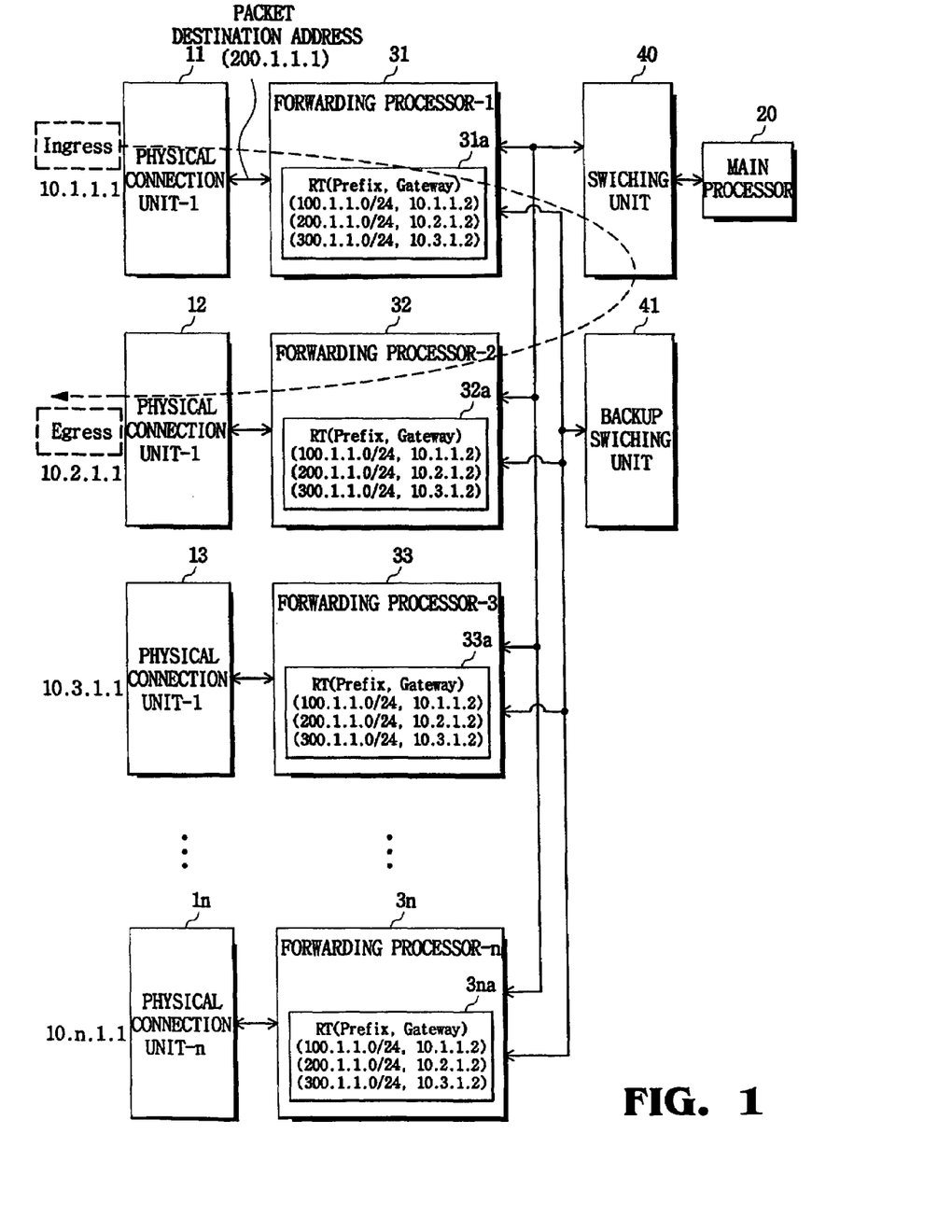
FIG. 1 is a conceptual block diagram schematic illustrating a process for forwarding packets in a conventional distributed router.

Turning now to the drawings, FIG. 1 is a conceptual block diagram schematic illustrating a process for forwarding packets in a conceptual configuration for a distributed router. Recalling that a router is typically constructed with four components: an input port, an output port, switching fabric and a routing processor, and that the routing processor executes a routing protocol, and creates a forwarding table that is used for packet forwarding, in a distributed architecture the forwarding engines may be positioned in respective line connection units in a server-type arrangement with a single forwarding engine shared by a plurality of line connection units.

The particular configuration of a distributed router illustrated in FIG. 1 includes physical connection units 11, 12, 13 through in performing input and output of packet transmission, a main processor 20 executing a routing protocol, forwarding processors 31, 32, 33 through 3n forwarding packets, a switching unit 40 providing exchanges of routing information and serving as a connection bus between main processor 20 and the respective forwarding processors 31, 32, 33 through 3n, and an auxiliary switching unit 41 that serves as a backup to switching unit 40 to redundantly provide exchanges of routing information.

When forwarding processors 31 through 3n receive packets, forwarding processors 32 search forwarding tables 31a, 32a, 33a through 3na so as to forward the packets to gateways corresponding to the destination addresses of the packets. For example, when forwarding processor 31 receives a packet having a destination address 200.1.1.1 through the ingress for physical connection unit 11, forwarding processor 31 searches forwarding table 31a. In this case, forwarding processor 31 searches among the routing entries in forwarding table 31a for a gateway address 10.2.1.1 corresponding to the destination address 200.1.1.1. Accordingly, that packet is switched by switching unit 40, and forwarded to the egress of physical connection unit 12 through forwarding processor 32.

Such a distributed router performs a routing function and a packet forwarding function in different line connection units. For this purpose, after main processor 20 constructs and updates its own routing table, main processor 20 transmits routing information that has been altered by the updating procedure to a forwarding engine through InterProcessor Communication (IPC) within the system. The forwarding engine constructs and updates its own forwarding table using the changes in routing information received from main processor 20.

Typically, propagation delay occurs between the time when the routing table is updated in the main processor and the time when the forwarding table is updated in the forwarding engine. Accordingly, user packets entering a distributed router during the propagation delay are transmitted through a routing path that has not yet been updated, and that is consequentially an incorrect routing path. This forwarding of packets over an incorrect path causes each packet to be transmitted through a routing path that has already become extinct, or alternatively, to be transmitted along a path that violates a routing policy. As a result, unnecessary packets are made to enter a network, thereby reducing the bandwidth of the network.

Furthermore, such packet forwarding through an erroneous path creates problems inside the system as well as in the external network.

Figure 2:
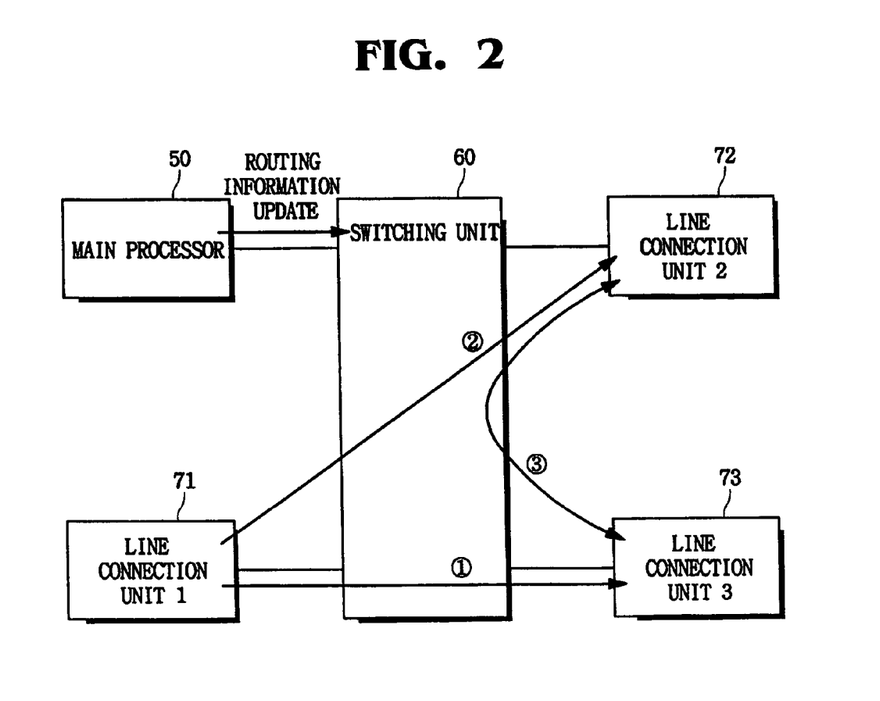
FIG. 2 is a conceptual block diagram schematic illustrating the ping-pong phenomenon in the conventional distributed router.

Referring now to FIG. 2, in the routing table of main processor 50 and in the forwarding tables of respective line connection units 71, 72, 73, the path of a packet, which has entered line connecting unit No1 71 with a specific destination address, is configured so that the packet is transmitted along a path 2 extending from line connection unit No1 71 to line connection unit No2 72, thus transmitting the packet through path 2.

In this case, when main processor 50 is notified by an external router that path 2 toward the destination address has changed to a path 1 toward line connection unit No3 73, main processor 50 should transmit the changed routing information to the respective line connection units 71, 72, 73 through switching unit 60. A time difference resides in the transmission of the changes in routing information to the respective line connection units 71, 72, 73.

If the changes in routing information representing a shift from path 2 to path 1 is transmitted to line connection unit No2 72 before the transmission of the packet, line connection unit No2 72 retransmits that packet received from line connection unit No1 71 to line connection unit No3 73 via path 3. In this scenario, if the changes in routing information has not yet reached line connection unit No3 73 line connection unit No3 73 repeats the transmission and reception of the packet to and from line connection unit No2 72, that is: line connection unit No3 73 firstly transmits to line connection unit No2 72 the packet received from line connection unit No1 71, and then receives a return of that packet along path 3 from line connection unit No2 72, which had earlier received the changes in routing information.

Such a return transmission is undesirable and is generally referred to as a "ping-pong" phenomenon. If the "ping-pong" phenomenon occurs, a loop is created within the system of the distributed router; the creation of the loop causes a considerable reduction in the bandwidth of the interprocessor communication within the system of the distributed router.

Figure 3A:
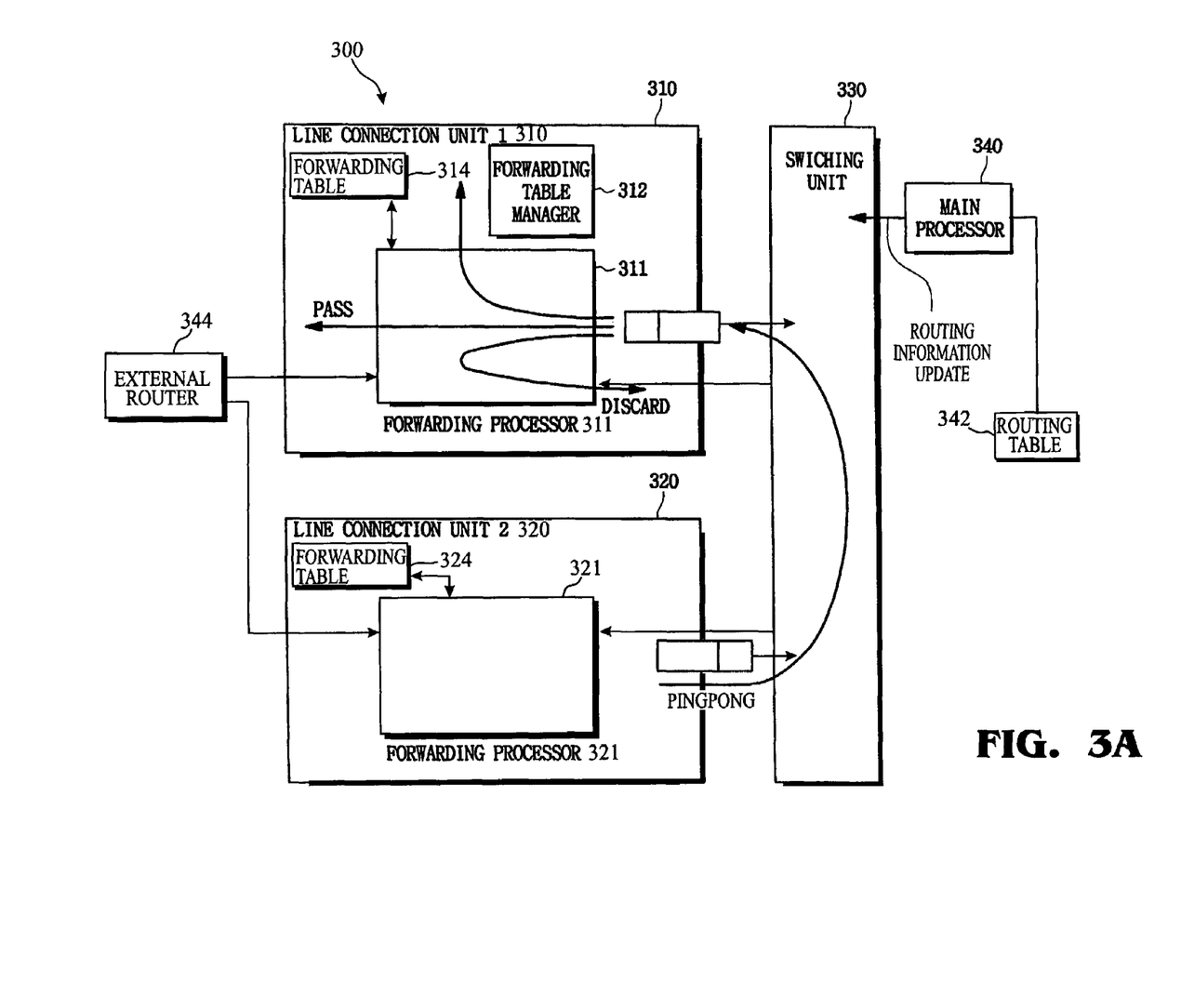

FIG. 3A is a diagram showing the configuration of a distributed router with a ping-pong preventing function, constructed as an embodiment of the principles of the present invention.

Referring to FIG. 3A, distributed router 300 with a "ping-pong" prevention function may be constructed with a plurality of line connection units 310 and 320, switching unit 330 and main processor 340.

Line connection units 310 and 320 include a plurality of forwarding processors 311 and 321, a forwarding table manager 312 and forwarding tables 314, 324.

Main processor 340 performs the function thereof through the use of a routing protocol, and should be provided with a routing table 342 that maintains and manages a routing path in the routing protocol.

Switching unit 330 functions to switch packets received from either of the respective line connection units 310 and 320 or main processor 340, toward designated ones of either the respective line connection units 310 and 320, or from main processor 340 to which the accompanying destination addresses indicate that the packets should be transmitted.

Forwarding processors 311 and 321 are located within in line connection units 310 and 320, respectively, and function to receive packets from either an external router 344 or from switching unit 330, and to transmit the packets received toward an output port direction that is ascertained by searching of the forwarding information stored in the corresponding forwarding table.

In such a distributed router, main processor 340 should be provided with a routing table 342 that reflects the most recent, updated path. Forwarding processors 310 and 320 allow routing paths to be easily searched during the forwarding of packets by enabling each of forwarding processors 310, 320 to copy a part of the routing table which has been created and is managed by one of the routing protocols, such as either RIP, OSPF or FGP4, of main processor 340, and storing and managing the copied part of the routing table within the forwarding table.

The forwarding table to which forwarding processors 310 and 320 refer when packets are forwarded has a data structure specially designed primarily for the improvement of search efficiency, but that data structure is relatively inefficient for the addition or deletion of routing paths.

If a destination path for a packet received by either of line connection units 310 or 320 can not be found during a search among the forwarding information stored in the forwarding tables of the corresponding forwarding processor 311, 321, the packet is moved to main processor 340 through switching unit 330 and the routing information stored by routing table 342 of the main processor 340 is then searched in order to locate the address of an adjacent router that will route the packet to its final destination.

Thereafter, the packet that had been transferred to main processor 340 is transmitted to that adjacent router through switching unit 330 and then to the egress of the corresponding forwarding processor 311, 321.

If the destination path can not be found during a search of the routing information stored in routing table 342 of main processor 340, the packet is discarded by main processor 340.

Routing table 342 of main processor 340 should be designed to be maintained and managed so as to immediately reflect the most recent changes of paths.

Additionally, an added or deleted path should be immediately reflected by, and immediately available in, forwarding tables 314, 324 of distributed router 300, at the lowest expense.

If added or deleted paths are not reflected by and made immediately available to forwarding processors 311, 321, a received packet should be transmitted to main processor 340 through switching unit 330; consequently, transmission delay is exacerbated by this buckpassing of the packet through an additional path that has been erroneously invoked in an effort to process the packet.

Meanwhile, from time-to-time main processor 340 receives changes in routing information from other adjacent, connected routers. It is desirable to immediately reflect these changes in routing information in routing table 342.

Main processor 340 adjusts the changed routing path to fit forwarding tables 314, 324, and transmits the adjusted routing path to the line connection units 310 and 320 through the internal IPC paths of the distributed router 300.

Meanwhile, line connection units 310 and 320 each perform a lookup among the forwarding information stored in their corresponding forwarding tables 314, 324 in order to retrieve destination addresses for all packets received from switching unit 330.

If, as a result of this lookup effort, it is determined that the destination path for a packet has been the subject of a table update, this packet is transmitted to forwarding table manager 312, which updates forwarding table 314, 324 in forwarding processors 311 and 321.

If it is determined that the destination path of a packet is toward the same switching unit 330 from which the packet was originally received, a ping-pong phenomenon is prevented by discarding this packet. In other words, when a packet is received from switching unit 330 by either main processor 340 or by forwarding processors 311, 312 of line connection units 310, 320, and the address carried by that packet indicates that the destination address of that packet is back through switching unit 330, the designation address is recognized as erroneous and that packet is discarded, thereby preventing that packet from being subjected to the ping-pong phenomenon and with repeated erroneous transmissions from, and to, switching unit 330 precipitated, by, for example, out-of-date routing information.

Figure 3B:
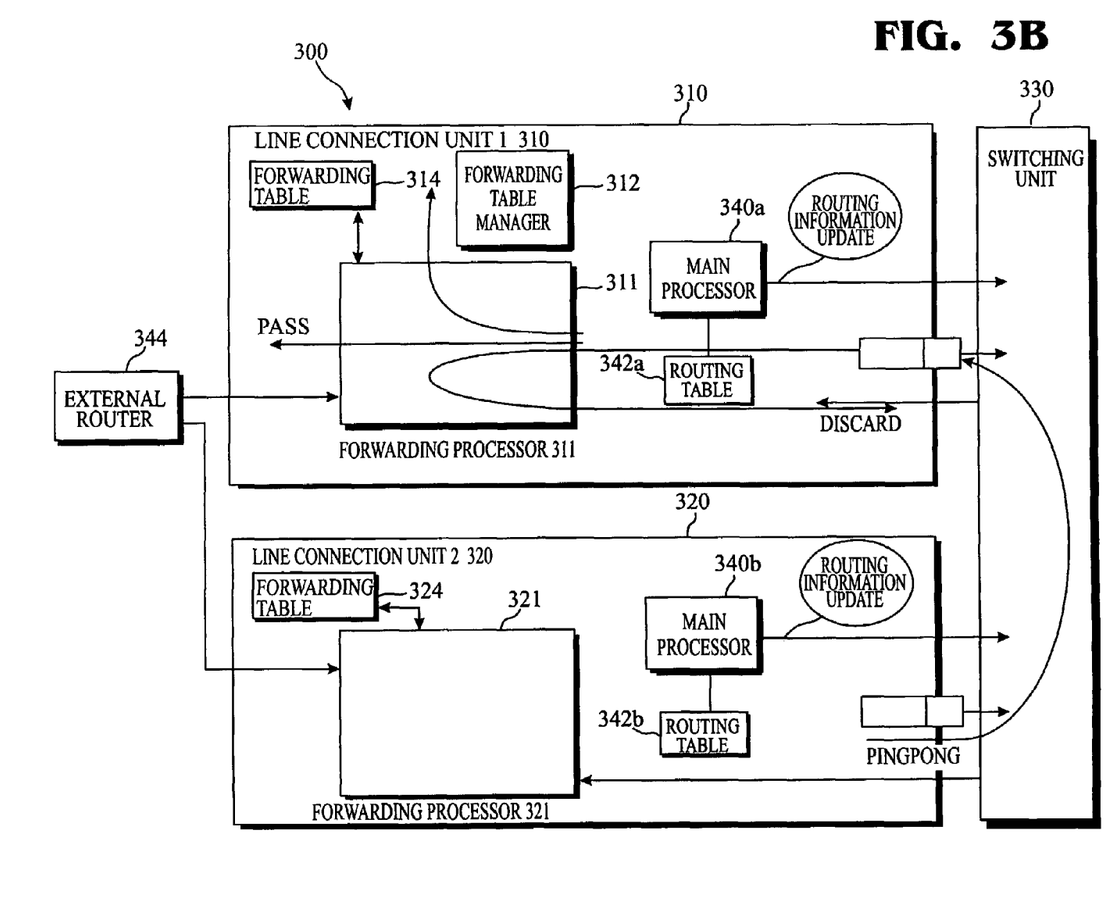
FIG. 3B is a block diagram schematic showing an exemplary configuration of an alternative embodiment of the present invention.

Turning now to FIG. 3B, it may be noted that although in FIG. 3A and in the details set forth in the foregoing paragraphs describe a distributed router in which main processor 340 is separated from forwarding processors 311 and 321, the present invention may be applied to a distributed router as illustrated by FIG. 3B in which forwarding processors 311, 321 are each provided with individual or dedicated main processors 340a, 340b, respectively, with each of main processors 340a, 340b executing a routing protocol that may, in particular implementations, be different routing protocols. In a particular implementation of the principles of the present invention, each main processor 340a, 340b may be equipped with a dedicated routing table 342a, 342b.

Figure 4:
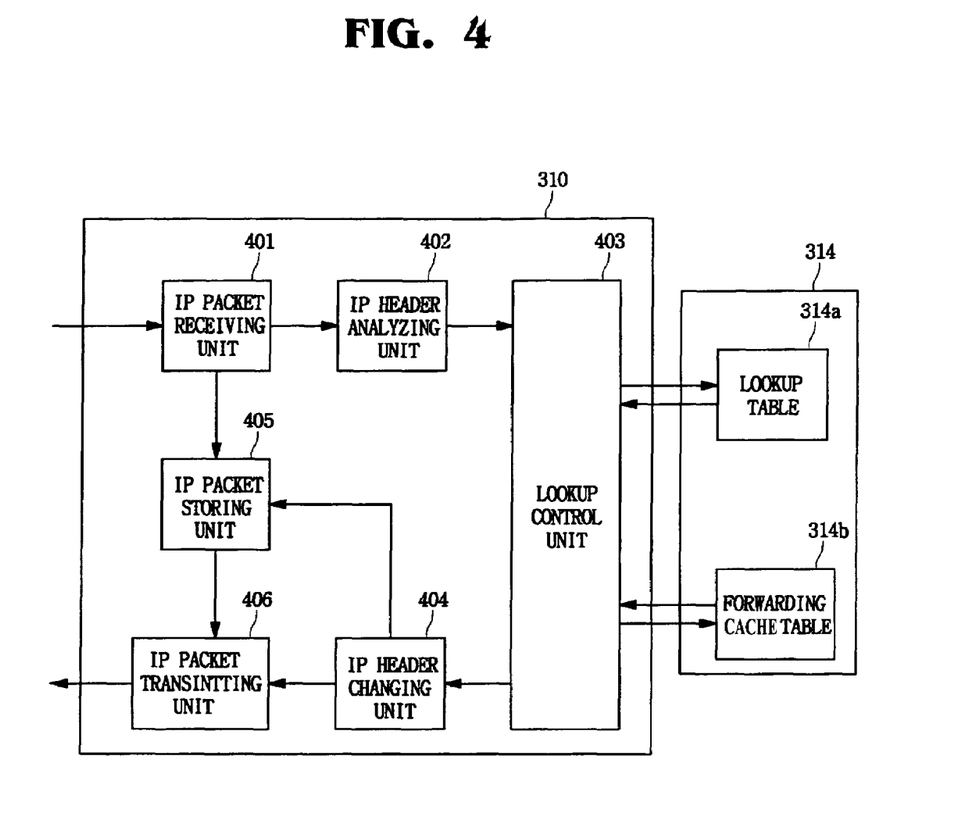
FIG. 4 is a block diagram schematic showing the configuration of a forwarding processor of FIGS. 3A, 3B.

FIG. 4 is a schematic block diagram showing the configuration of the forwarding processors 311 or 321 shown in FIGS. 3A and 3B.

Referring to FIG. 4, forwarding processors 311, 321 of FIGS. 3A, 3B includes Internet Protocol (IP) packet receiving unit 401, IP header analyzing unit 402, lookup control unit 403, IP header changing unit 404, IP packet storing unit 405, and IP packet transmitting unit 406.

Forwarding table 314 is generally constructed of a lookup table 314a and a forwarding cache table 314b. Lookup table 314a stores address indexes for forwarding cache table 314b intended for lookup, while forwarding cache table 314b stores forwarding information for the packets in correspondence to each address index stored in lookup table 314a. Here, the forwarding information includes output directions and Media Access Control (MAC) addresses to which the packet of interest is to be transmitted.

IP packet receiving unit 401 functions to extract an IP header field from each received IP packet and to store the IP header field of each received IP packet and a payload field in the packet storing unit 405.

The IP header analyzing unit 402 functions to make checks, such as a Time-To-Live 19 (TTL) check, an IP version check and an IP header checksum check, on an IP header received from IP packet receiving unit 401, and to extract an IP address required for lookup control.

Lookup control unit 403 uses the IP address to latch the address index of forwarding cache table 314b to which the corresponding IP address is intended to make reference from the lookup table 314a, looks up corresponding forwarding cache table 314b to read the forwarding information of the corresponding packet from the corresponding forwarding cache table 314b, and discards the corresponding packet when the corresponding packet has such an output direction that is not toward outside but toward the switching unit into which the packet has been inputted, thereby preventing the ping-pong phenomenon.

IP header changing unit 404 functions to change the header of the packet so that the corresponding packet is transmitted to its destination in correspondence to the forwarding information obtained from lookup control unit 403 as a result of the lookup. To this end, IP header changing unit 404 decreases the TTL, performs a recalculation of the checksum, and changes the MAC address of the destination in the header of the packet.

IP packet transmitting unit 406 functions to transmit the packets stored in IP packet storing unit 405 to the neighboring external router using information of the output directions.

Figure 5:
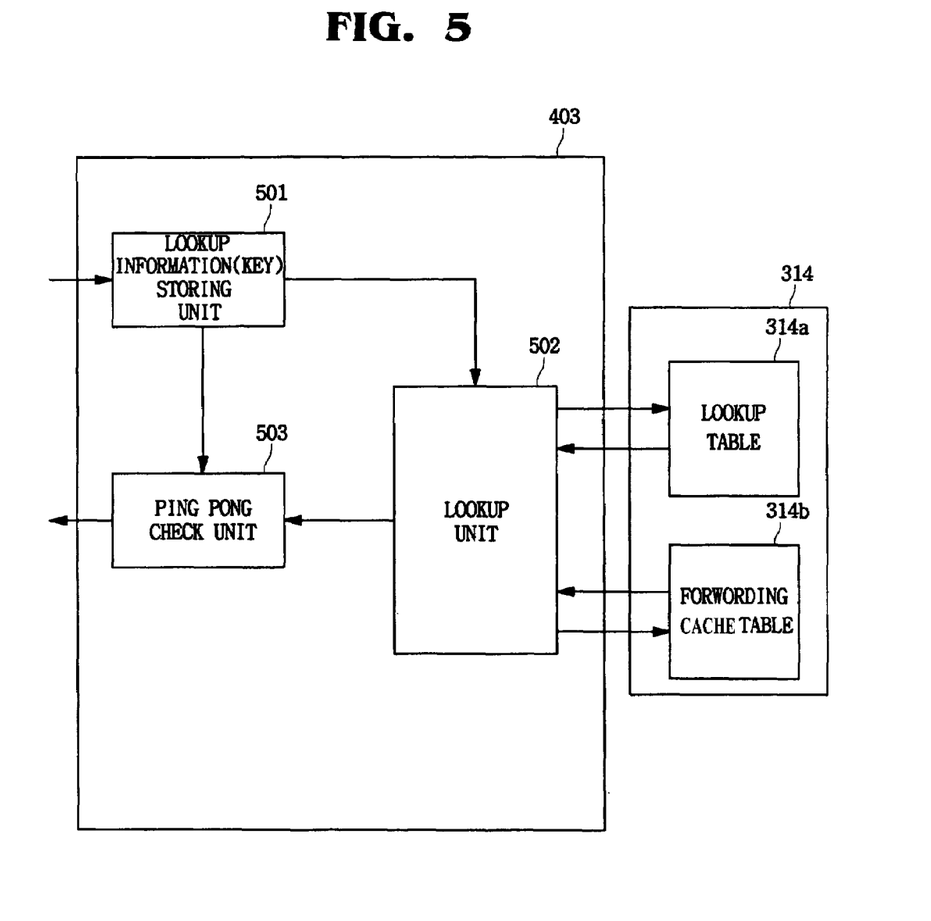
FIG. 5 is a block diagram schematic of a lookup control unit suitable for use in the forwarding processor of FIG. 4.

FIG. 5 is a block diagram of lookup control unit 403 of FIG. 4.

Referring to FIG. 5, lookup control unit 403 is generally constructed with a lookup information storing unit 501, a lookup unit 502 and a ping-pong check unit 503.

Lookup information storing unit 501 stores information required for an IP lookup with respect to each of various services, that is, an IP destination address, an IP source address, a Transmission Control Protocol (TCP) destination address port number, a TCP source port number, the connection information, for each packet received and a Virtual Private Network (VPN) route identification.

In more detail, in the case of a VPN lookup, the VPN route identification and destination address correspond to the information required for a service lookup. In the case of a real-time service lookup, the IP destination address corresponds to the information required for a service lookup. In the case of an emulated leased line service, the IP destination address and IP source address correspond to the information required for a service lookup.

Lookup unit 502 latches the address index of forwarding cache table 314b from lookup table 314a, obtains an address of forwarding cache table 314b intended for reference, has access to the forwarding cache table 314b belonging to the address, and reads the forwarding information stored in the corresponding forwarding cache table 314b.

Here, the forwarding information stored in the corresponding forwarding cache table 314b contains information on the MAC address of the destination, the output direction, a maximum transmission unit of the output port. In addition, stored transmission connection information, packet class information, VPN stacking label information, Differentiated Service (DS) information and so forth may be contained.

Ping-pong check unit 503 extracts information on the output direction from the forwarding information which is read from forwarding cache table 314b by lookup unit 502, and checks whether, or not, the extracted output direction matches with an input direction read at lookup information storing unit 501. As a result of checking, when the output direction of the corresponding packet is not toward switching unit 330 into which the packet has been input, a determination is made to transmit the packet. When however, the output direction of the corresponding packet is toward the switching unit from which the packet has been input, a determination is made to discard the packet.

Figure 6:
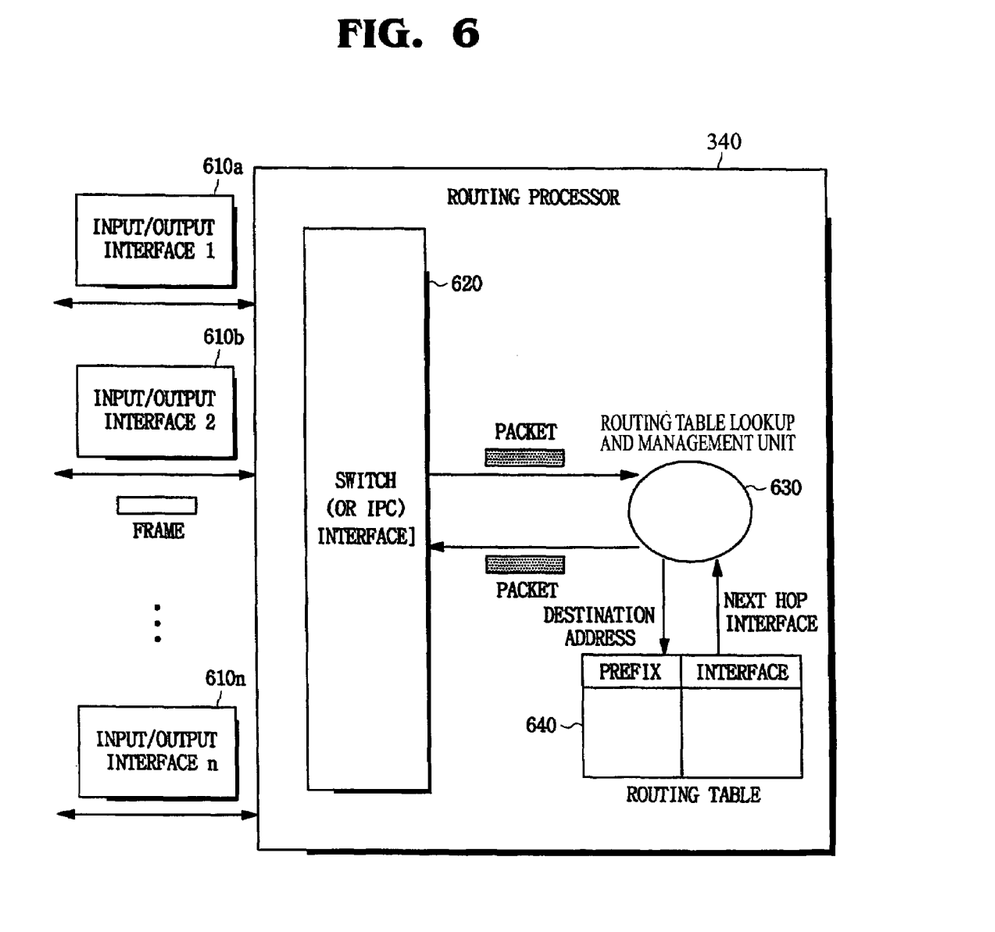
FIG. 6 is a diagram showing the configuration of a main processor suitable for use in the distributed router illustrated by FIGS. 3A, 3B.

FIG. 6 is a diagram showing the configuration of main processor 340 of FIG. 3A, and main processors 340a, 340b of FIG. 3B.

Referring to this drawing, the main processors of FIGS. 3A, 3B include a plurality of input/output interfaces 610a through 610n for handling packets transmitted and received to and from switching unit 330, a switch (or IPC) interface 620 for buffering packets transmitted and received, to and from, input/output interfaces 610a to 610n and for interfacing switching unit 330 with the following component, and routing table lookup and management unit 630 for receiving packets from switch interface 620, looking-up the packets in the routing table 640 and returning the packets to switch interface 620 in order to allow the packets to be transmitted to corresponding input/output interfaces 610a through 610n.

It may be noted that, related standard documents currently circulated within the industry, or the Request For Comments (RFCs), do not put restrictions on the use of an array tree or trie, which is a commonly used data structure for searches, or on the use of any algorithm for handling the data structure.

Figure 7:
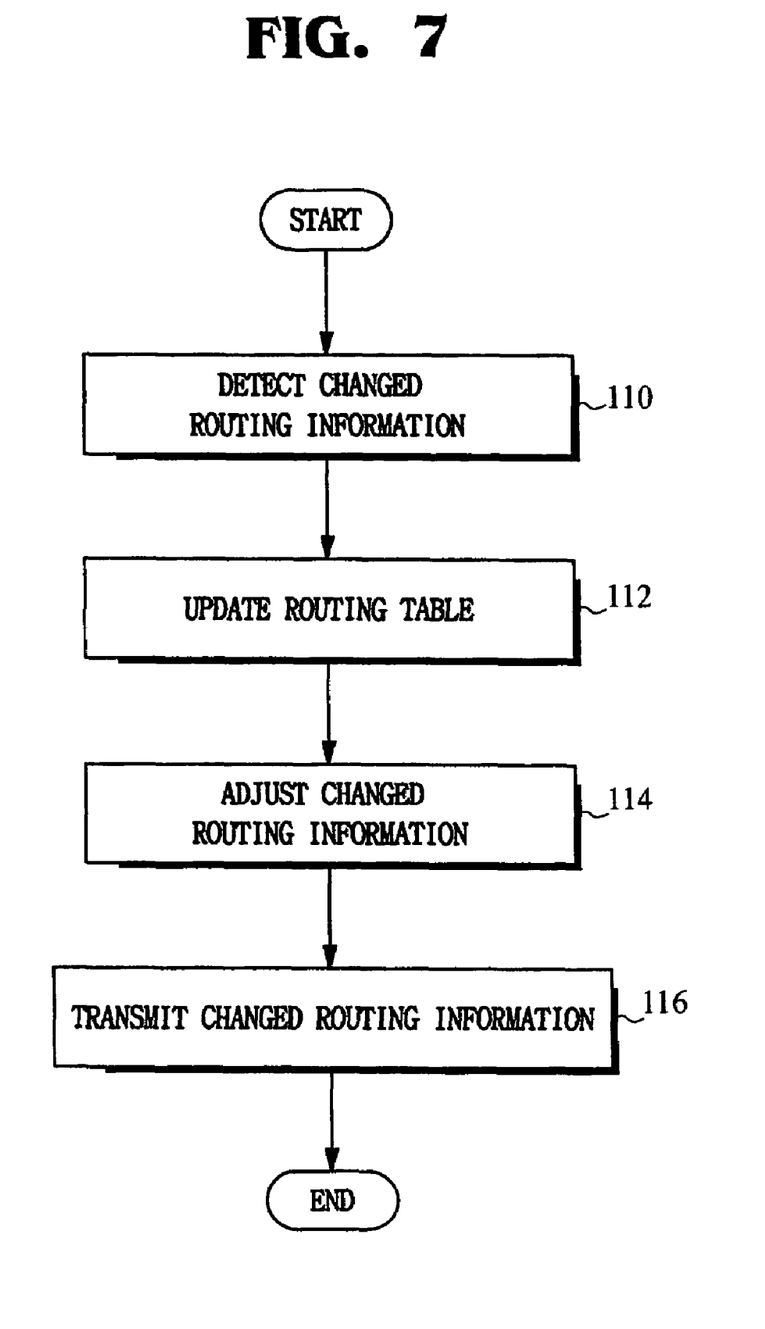
FIG. 7 is a flowchart showing a process for updating routing information in the distributed router according to an embodiment of the present invention.

FIG. 7 is a flowchart showing a process of updating routing information in the distributed router in the practice of one embodiment of the present invention.

First, main processor 340 determines whether the path of a specific packet forwarded to a specific address is changed at step 110, and updates routing table 342 at step 112.

Main processor 340 makes any changes in the routing information to fit forwarding tables 314, 324 of the respective line connection units at step 114, and transmits the updated routing information to the respective line connection units 310, 320 through the internal IPC paths of distributed router 300 at step 116.

Figure 8:
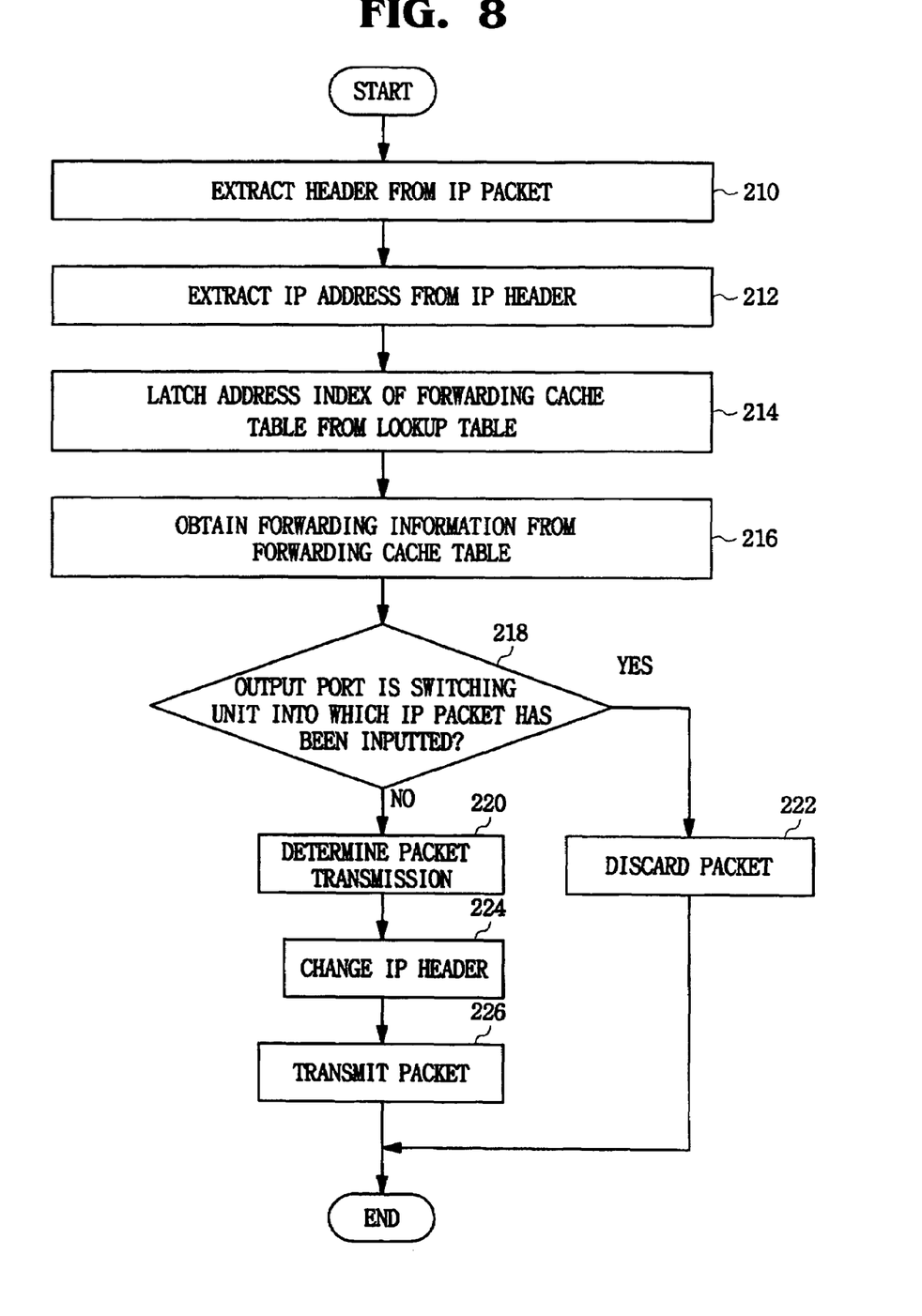
FIG. 8 is a flowchart showing a process for preventing the occurrence of a ping-pong phenomenon in the distributed router according to the embodiment of the present invention.

FIG. 8 is a flowchart showing a process of preventing a ping-pong phenomenon in the distributed router according to the practice of one embodiment of the present invention.

IP packet receiving unit (e.g., receiving unit 401) extracts an IP header from an incoming packet and stores a payload extracted from the packet in packet storing unit 405 at step 210.

IP header analyzing unit 402 makes checks, such as a TTL check, an IP version check and an IP header checksum check, on an IP header received from IP packet receiving unit 401, and extracts an IP address required for lookup control at step 212.

Lookup control unit 403 latches an address index of forwarding cache table 314b intended for the lookup from lookup table 314a using the IP address at step 214.

Lookup control unit 403 reads the corresponding forwarding cache table 314b according to an address of the forwarding cache table 314b latched from lookup table 314a, and fetches forwarding information stored in the corresponding forwarding cache table 314b at step 216.

Lookup control unit 403 extracts information on an output direction of the corresponding packet from the forwarding information read from the forwarding cache table 314b, and checks whether the output direction of the corresponding packet matches with an input direction of inputted packet or not at step 218.

As a result of checking, when the output direction of the corresponding packet is not toward the switching unit into which the packet has been inputted, it is determined to transmit the packet at step 220. When however, the output direction of the corresponding packet is toward the switching unit into which the packet has been input, a determination is made to discard the packet at step 222.

When it is determined to transmit the packet, the IP header changing unit 404 changes a header value of the packet on the basis of the forwarding information read at forwarding cache table 314b so that a packet stored in IP packet storing unit 405 is transmitted to a destination corresponding to the corresponding forwarding information, and simultaneously informs IP packet transmitting unit 406 that there is a packet to be transmitted. In this case, the changed header information includes the MAC address of the destination, the TTL and the checksum.

Thus, IP packet transmitting unit 406 reads the packet stored in IP packet storing unit 405 and transmits the read packet through the corresponding output direction in correspondence with the forwarding information.

The foregoing paragraphs have described the details of a distributed router in which a single main processor executes a routing protocol and changes in routing information is transmitted to a plurality of forwarding processors. The principles of the present invention could also be applied to a distributed router in which a plurality of line connection units are equipped with a plurality of main processors for executing routing protocols, respectively, and the main processor of each of the line connection units transmits changes in routing information to the other forwarding processors.

As described above, the present invention advantages prevents the loss of a packet for updating a forwarding table and an interruption of the inflow of a packet forwarded along an erroneous path to a network by preventing an occurrence of the ping-pong phenomenon.

Further, the present invention also improves the performance of an internal IPC by preventing a diminution of the bandwidth of the IPC.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distributed router, comprising:
a plurality of line connection units;
a main processor disposed to construct and manage a routing table, to receive changes of routing information from adjacent routers, update the routing table, and to broadcast changes of routing information received through internal InterProcessor Communication paths within the distributed router;
a switching unit coupled to switch transmission of packets between the line connection units and the main processor;
a plurality of forwarding tables positioned in different corresponding ones of the plurality of line connection units, to copy, store and manage parts of the routing table; and
a plurality of forwarding processors positioned in different corresponding ones of the plurality of line connection units, to receive the changes of routing information broadcast by the main processor through the internal InterProcessor Communication paths of the distributed router, to update different corresponding ones of the forwarding tables, to ascertain a source address of a packet received, to ascertain an output direction of a packet having a source address of an external router by looking-up forwarding information in corresponding ones of the forwarding tables for the packet received from the external router, and transmitting the packet to the output direction ascertained, to determine whether an output direction of a packet having a source address of the switching unit is toward an external router or toward the switching unit by looking-up the forwarding information in the corresponding forwarding table for the packet, to transmit the packet to the external router when the determined output direction of the packet is toward the external router, and to discard the packet when the determined output direction of transmission of the packet is toward the switching unit.

2. The distributed router of claim 1, wherein the main processor comprises:
a plurality of input/output interfaces handling packets transmitted and received to and from the switching unit;
a switch interface buffering packets transmitted and received via the input/output interfaces, and interfacing with the switching unit; and
a routing table lookup and management unit receiving packets from the input/output interfaces through the switch interface, and transmitting packets received to the input/output interfaces in conformance with routing information stored in the routing table, and receiving the changes of routing information from external routers, updating the routing information with the changes of routing information, and transmitting updated routing information to the forwarding processors through the internal InterProcessor Communication paths of the distributed router.

3. The distributed router of claim 1, wherein each of the forwarding processors comprises:
an Internet Protocol packet receiving unit for extracting an IP header field from each incoming packet;
an IP header analyzing unit extracting an IP address required for lookup control from each IP header received from the Internet Protocol packet receiving unit;
a lookup table storing address indices for the forwarding tables where information on each packet is stored;
a lookup control unit latching the address of the forwarding table intended for reference from the lookup table using the IP address extracted by the IP header analyzing unit, reading forwarding information from the forwarding table, when a packet is received from the switching unit and an output direction of the packet is toward an external router, making a determination to transmit the packet to the external router, when a packet is received from the switching unit and the output direction of the packet is toward the switching unit, making an determination to discard the packet, and when a packet is received from an external router, transmitting the packet to an output address associated with the packet;
an IP header changing unit changing information of the IP header of each packet based on the forwarding information obtained by the lookup control unit; and
an IP packet transmitting unit transmitting the stored packets according to the changes in information for the header of each packet to the external router.

4. A distributed router, comprising:
a plurality of line connection units;
a plurality of main processors positioned in corresponding different ones of the plurality of line connection units, to construct and manage a routing table, receive changes in routing information from adjacent routers, update the routing table, and broadcast changes of routing information through IPC paths of the distributed router;
a switching unit switching packets received from the line connection units to corresponding ones of the line connection units to which these packets are transmitted;
a plurality of forwarding tables positioned in corresponding different ones of the plurality of line connection units, to copy, store and manage parts of the routing table; and a plurality of forwarding processors positioned in corresponding different ones of the plurality of line connection units, to ascertain an output direction of a packet received from an external router by making a lookup in a corresponding one of the forwarding tables and transmit the packet received to the output direction ascertained, to determine whether an output direction of a packet received from the switching unit is toward an external router or the switching unit by making a search of forwarding information stored in the corresponding one of the forwarding tables for the packet, transmit the packet to the external router when the output direction is toward the external router, and discard the packet when the output direction is toward the switching unit, and update the forward table in response to reception of changes in routing information broadcast by the main processor through the internal IPC paths of the distributed router.

5. A ping-pong preventing method using a distributed router, comprising:
a step 1 in the distributed router having a switch unit connecting a main processor and a plurality of line connection units, of the main processor updating a routing table, and transmitting changes of routing information to respective line connection units through internal paths of the distributed router, when the main processor receives changes of routing information from an adjacent router;
a step 2 of a forwarding processor positioned in each of the line connection units updating a forwarding table in response to reception of the changes of routing information broadcast from the main processor through the internal paths of the distributed router; and
a step 3 of the forwarding processor receiving a packet from one of an external router and the switching unit, ascertaining input and output directions of the packet, transmitting the packet received from an external router to the switching unit, discarding the packet received from the switching unit when the output direction of the packet is toward the switching unit, and transmitting the packet received from the switching unit when the output direction of the packet is not toward the switching unit.

6. The method of claim 5, wherein step 1 of updating the routing table, comprises:
a step 1-1 with the main processor updating the routing table when the main processor receives the changes of routing information;
a step 1-2 with the main processor adjusting changes in a routing path to fit the forwarding table of each of the line connection units; and
a step 1-3 with the main processor transmitting the changes of the routing information to the respective line connection units through the internal paths of the distributed router.

7. The method of claim 5, wherein step 3 of the forwarding processor ascertaining input and output ports, comprises:
a step 3-1 with the forwarding processor ascertaining the output direction of the packet received from an external router by searching the forwarding table and transmitting the packet according to the output port ascertained;
a step 3-2 with the forwarding processor ascertaining the output direction of the packet received from the switching unit by searching the forwarding table, and transmitting the packet when the output direction is toward an external router; and
a step 3-3 with the forwarding processor ascertaining the output direction of the packet received from the switching unit by searching the forwarding table, and discarding the packet when the output direction is toward the switching unit.

8. The method of claim 5, wherein the forwarding processor receiving a packet from one of an external router and the switching unit, and ascertaining input and output directions of the packet in step 3 comprises:
- a step of the forwarding processor extracting an IP header from an incoming IP packet;
- a step of the forwarding processor extracting an IP address for lookup control from the IP header; and
- a step of the forwarding processor ascertaining the output direction by using the IP address to make a search of forwarding table using the IP address.

9. A router with a distributed architecture, comprised of:
- a main processor constructing and managing a routing table, receiving changes of routing information from adjacent routers, updating the routing table, and broadcasting changes of routing information received through internal paths within the distributed router;
- a plurality of line connection units;
- a switching unit directing transmission of packets between said main processor and said line connection units; each of said line connection units comprising:
  - a forwarding table storing a copy of parts of said routing table, and
  - a forwarding processor making a discontinuance of transmission of any packet received by a corresponding one of said line connection units from said switching unit and designated by a destination address to be subsequently forwarded to said switching unit, determining source addresses of received packets, transmitting any packet having a source address of said switching unit to a destination address associated with the packet if the destination address does not correspond to said switching unit, and transmitting any packet having a source address of an external router to a destination address associated with the packet.

10. The router of claim 9, with said forwarding processor comprised of:
- when the packet has a source address of said switching unit and said destination address of the packet indicates that an output direction of the packet is toward an external router, transmitting the packet to the external router,
- when the packet has a source address of said switching unit and said destination address of the packet indicates that an output direction of the packet is toward said switching unit, making said discontinuance, and
- when the packet has a source address of an external router, transmitting the packet to a destination address associated with the packet.

* * * * *